Nov. 16, 1965     R. CARMICHAEL ETAL     3,218,197
COMBINED SAFETY BLOW-OUT AND GAS PERMEABLE MEMBRANE
FOR GALVANIC CELLS
Filed Sept. 20, 1963

INVENTORS
ROBERT CARMICHAEL
WILLIAM A. VULPIO

BY
ATTORNEY

United States Patent Office 3,218,197
Patented Nov. 16, 1965

3,218,197
COMBINED SAFETY BLOW-OUT AND GAS PERMEABLE MEMBRANE FOR GALVANIC CELLS
Robert Carmichael, Lakewood, and William A. Vulpio, Cleveland, Ohio, assignors to Union Carbide Corporation, a corporation of New York
Filed Sept. 20, 1963, Ser. No. 310,250
8 Claims. (Cl. 136—133)

This application is a continuation-in-part of co-pending application Serial No. 11,082, filed February 25, 1960, now abandoned, in the names of R. Carmichael and W. A. Vulpio, and entitled, "Combined Safety Blow-Out and Gas-Permeable Membrane for Galvanic Cells."

The invention relates to a sealed galvanic cell, and particularly concerns a seal gasket therefor having a combined safety-blow-out and gas permeable membrane as an integral part thereof.

The chemical nature of many electro-chemical systems employed for the production of electricity is such that gas, usually hydrogen, is generated during storage and sometimes during or following service use. When sealed cell containers are employed, as is the case in certain primary and secondary cells, the build-up of gas-pressure within the sealed container has proven dangerous.

In the past, a dangerous build-up of pressure generally has been prevented by some sort of continuous venting means or by periodic release through valve systems. These means have included venting slits or apertures in gasket membranes or sealing gums which pass gas bubbles and then reform after release.

Alleviation of built-up gas pressures from alkaline cells has been found to be particularly difficult. Alkaline electrolytes are not easy to contain within a sealed container and they will creep along almost any sealing surface and contaminate the outside of the cell package. Accordingly, it has been the practice in order to prevent creepage and loss of electrolyte to seal the cell container very tightly. Unfortunately, higher and more dangerous pressure build-ups are a direct result of tightly sealed cells. In an extremely tight sealed alkaline cell, such as the one described in U.S. Patent No. 3,042,734, which issued July 3, 1962, to R. Carmichael and J. L. S. Daley, a reliable means of venting the cell and thereby preventing a dangerous pressure build-up is particularly desirable.

Most venting systems which have been devised, will satisfactorily relieve high gas pressures, but unfortunately, they will in addition permit electrolyte leakage. For example, release valves which are intended to reseal after activation under pressure, are too easily fouled by caustic electrolyte salts. These salts are formed when caustic electrolyte, which has crept along the sealing surface of the valve, combines with the carbon dioxide in the air to form a carbonate. The carbonate salt cakes the valve surface and prevents proper resealing of the valve, and more electrolyte will then leak through the partially opened valve. The other means which have been devised to permit pressure release all evidence comparable difficulties.

A further disadvantage of the prior art techniques is that several parts are required to be added to the basic cell construction in order to provide a gas venting and relief means. These additional parts are frequently expensive and are usually troublesome during cell assembly. The additional parts also create new junctions between the inside of the cell and its outside which must be sealed to prevent electrolyte leakage.

Accordingly, the principal object of the invention is to provide a continuous venting means which will rupture at predetermined safe pressure, thereby preventing an explosion of the cell container due to abnormally high pressures, but which does not require individual and separate parts to be added to a cell construction in addition to the normal cell components.

Broadly stated, the object of the invention is accomplished by a combined safety blow-out and gas permeable membrane which is an integral part of a seal gasket used in sealing the cell or battery container.

The invention will be more readily understood by reference to the accompanying drawing wherein.

Figure 1:
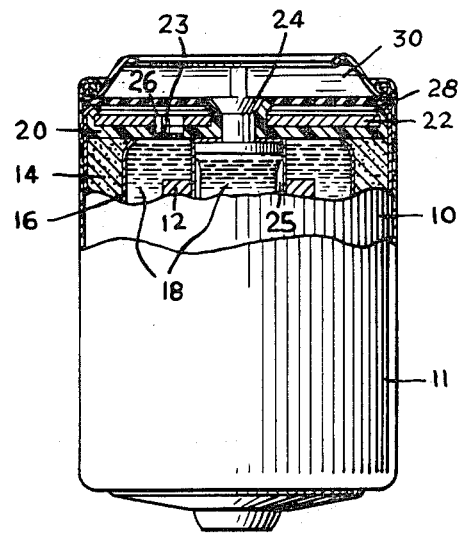
FIG. 1 is a front elevation, partially in section, of an alkaline manganese dioxide-zinc cell, which utilizes the seal gasket of the invention.

More specifically, according to the invention, the combined safety blow-out and gas vent comprises a membrane which is an integral part of a plastic gasket used to seal an alkaline cell container and which is thinner than adjacent areas of the gasket. The membrane is designed to vent gases formed within the cell during normal shelf storage by diffusion of gas therethrough, and to rupture rapidly upon excessive build-up of gases under abusive conditions, such as excessive overcharge, at pressures below the point at which the cell container is likely to explode. This integral membrane, which may be provided in the gasket by either proper molding procedures or machining, positively prevents any electrolyte leakage at this point. In addition, since a conventional cell usually comprises a cup-shaped container with an open end and a cell closure sealed in the open end by means of a single seal gasket, the incorporation of the membrane in the seal gasket in accordance with the invention eliminates the need in the prior art to incorporate new and separate venting parts in the cell construction. Thus, difficulties in handling additional parts during manufacture and in sealing new junctions are avoided.

In the design of any particular combined safety blow-out and gas permeable membrane, there are a number of variables which must be taken into account.

The blow-out or rupture function of the membrane is dependent upon the physical properties of the membrane material, such as tensile strength and elongation, and also the dimensions of the membrane, i.e., the area of the membrane surface under stress and the thickness of the membrane at its periphery, which is the point of localized stress when pressure is exerted upon the membrane. For any given material, the rupture pressure increases with increased thickness in the periphery of the membrane and, conversely, decreases with increased membrane area. The operating or deflecting area for membrane rupture is the total area that will be deflected under stress, and deflection will occur at the thinnest section of the membrane.

Table I below indicates the relationship between blow-out pressure and membrane thickness for the circular membrane illustrated in FIGS. 1 and 2. The data in Table I were obtained from tests in which seal gaskets employing the blow-out membrane were fixed to a specially adapted hydrogen blow-out apparatus. Except for the presence of an alkaline electrolyte, a factor which has no effect on the function of the membrane, all the elements of an alkaline cell were present in the cells tested. The membrane in each test had a diameter of 0.260 inch and the thickness of the membranes were varied as shown. The membranes were made of molded nylon.

Table I

| Membrane blow-out pressure (pounds per square inch) | | Membrane thickness (inches × 10⁻³) | |
|---|---|---|---|
| Average | Range | Average | Range |
| 225 | 200–250 | 3.5 | 3.0–4.0 |
| 285 | 275–300 | 4.5 | 4.0–5.0 |
| 335 | 300–375 | 5.5 | 5.0–6.0 |

As can be observed from the table, the membrane blow-out pressure varies in a linear fashion with increased membrane thickness.

The venting rate of the membrane is dependent upon the membrane material employed, the gas permeability of the material, the membrane area and its thickness, and the pressure differential across the membrane. It has been generally observed that the rate of gas transmission through the membrane of a given material under constant conditions is linear with increasing thickness up to about a thickness of .015 inch.

Table II below, indicates the hydrogen gas permeability characteristics of various plastic materials from which the combined safety blow-out and gas permeable membrane of the invention may suitably be made. In addition, the table shows the calculated hydrogen gas venting rate for each material when employed for the circular membrane shown in FIGS. 1 and 2, in a "D" size alkaline cell; size "D" being as defined in Circular 466 of the National Bureau of Standards of the United States Department of Commerce. Cell calculations were based upon a constant membrane area and thickness and upon a pressure differential across the membrane of 6 atmospheres. The numbers in the table below found in the column headed Permeability Constant in each instance is the number of centimeters of hydrogen at standard temperature and pressure that would be transferred through a cube of the specified material of cross section of one square centimeter and one centimeter thick per second at a pressure of one centimeter of mercury times $10^9$.

Table II

Calculated Hydrogen Gas Venting for "D" Size Alkaline Cells Through Membranes Under Six Atmospheres Pressure Differential

| Material | Membrane area, sq. inches | Membrane thickness, inches | Permeability constant | Calculated hydrogen gas venting, cc./week |
|---|---|---|---|---|
| Nylon | 0.031 | 0.003 | 0.10 | .7 |
| Vinyl | 0.031 | 0.003 | 0.99 | 7.33 |
| Polyethylene | 0.031 | 0.003 | 0.8 | 5.92 |

It is apparent from Table II, that some materials will diffuse gases, hydrogen in this instance, at a much faster rate than others. Vinyl and polyethylene plastics, for example, will diffuse hydrogen gas approximately ten times faster than nylon. Accordingly, when nylon is used in the practice of the invention, it may be necessary, depending upon the requirements of the cell, to alter the design of the membrane so that a desired venting rate is obtained. Similarly, the characteristics and properties of the particular galvanic cell in which the membrane is to be employed, must be considered. For example, the active materials of some cells can be adjusted to minimize gassing. If very little gassing occurs in a specific cell, the design of the membrane may be altered to allow only very slow gas passage, but to permit close control of the pressure required to rupture the membrane.

Referring now to the drawing, FIG. 1 illustrates an alkaline-manganese dioxide zinc cell of the type disclosed in the aforementioned issued patent of R. Carmichael et al. The cell comprises a cupped container 10, provided with an insulating jacket 11, having an anode 12 and cathode 14, separated by a separator 16 and electrolyte 18, disposed therein. A cupped container usually comprises a cylinder permanently closed at one end either by drawing or extruding the container as a single unit or by welding a cover over one end of cylinder. Thus, in general, one end of a metallic cupped container is sealed by a metal-to-metal bond between the cylinder portion and the end closure portion.

The open-cupped polarized container 10 is sealed at its open end by an annular U-shaped seal gasket 20 having an unpolarized metallic cover 22, which is provided with a venting aperture 23, recessed therein and an oppositely polarized centrally located terminal rivet 24 which is in contact with the anode current collector 25. The seal gasket 20 is radially compressed between the terminal 24 and the cover 22 and between the cover 22 and the container 10 thereby resulting in an extremely leak resistant gas tight cell.

Figure 2:
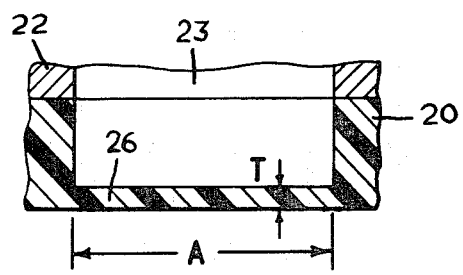
FIG. 2 is an enlarged fragmentary view of the seal gasket shown in the cell of FIG. 1.

The combined gas permeable and safety blow-out membrane is an integral part of the seal gasket 20 and comprises, as is more readily seen in FIG. 2, a machined or molded membrane 26 located in the seal gasket 20. The membrane 26 has a membrane thickness T and a membrane area of diameter A. The seal gasket 20 may of course be provided with one or more membranes 26 according to requirements, as shall later be described. In the embodiment shown in FIG. 2, the membrane venting area of diameter A is equal to the membrane blow-out area of diameter A, that is to say, diffusion of gases will take place across the entire cross-section of the membrane 26. In this embodiment, all other things being equal, the blow-out or rupture pressure of the membrane 26 is dependent solely upon membrane thickness T.

Figure 3:
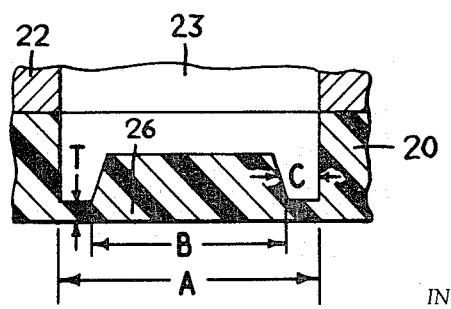
FIG. 3 is an enlarged fragmentary view of another seal gasket embodying the principles of the invention.

FIG. 3 illustrates a membrane 26 which is particularly suitable for use where a low venting rate for a given membrane area is desired. In this embodiment, the membrane has a blow-out area of diameter A, but a membrane venting area of diameter A–B or C, that is diffusion of gases will take place through the area of diameter C. The membrane thickness T being also the membrane peripheral thickness, where deflection stresses are localized, regulates and determines the rupture pressure of the membrane. It will be noted that the low venting rate membrane of FIG. 3, assuming it to have the same area and thickness as the membrane of FIG. 2, will rupture at the same pressure, while the venting rate is much lower. An additional feature of the low venting rate membrane of FIG. 3 is that for a given membrane area of diameter A and thickness T, the diffusion or venting rate may easily be controlled for a desired application merely by varying the membrane area C without altering the designed rupture pressure.

A seal gasket embodying the integral blow-out and venting membrane of the invention suitable for use where a high venting rate and a high rupture pressure is desired, would comprise a seal gasket provided with a plurality of membranes of the type illustrated in FIG. 2. At least one of the membranes would rupture at the desired rupture pressure, while at the same time the multiple members would increase the membrane venting area whereby greater diffusion of gas is obtained without lowering the rupture pressure.

It should be obvious to one skilled in the art, that in each of the embodiments shown, the membrane need not be circular in shape and in fact may assume many configurations, such as a kidney shaped membrane which is suitable for a high venting rate, low rupture pressure membrane, keeping in mind that large areas provide lower rupture pressures for any given membrane thickness. In small size cells the membrane may be in the shape of an annular ring surrounding the negative terminal aperture.

In cells employing the membrane of the invention, it is desirable to provide an external insulator 28 and metallic cover 30, which is in contact with the polarized terminal 24, to contain the membrane 26 in the event it should rupture or blow out.

Table III below, contains the results obtained from tests in which a quantity of "D" size cells were deliberately overcharged to provide high gas build-ups. All the cells tested were of the type illustrated in FIG. 1. A portion of the cells tested were provided with the combined safety blow-out and venting membrane of FIG. 2 in the seal gasket, another portion with the membrane of FIG. 3, and another portion had no membrane in the seal gasket.

*Table III*

| Membrane | Number of cells charged | Percent of safe membrane blow-out | Percent of violent cell rupture |
| --- | --- | --- | --- |
| FIG. 2 | 50 | 100 | 0 |
| FIG. 3 | 50 | 100 | 0 |
| No membrane | 50 | 0 | 100 |

As can be seen from the table, the safety blow-out and gas permeable membrane of the invention absolutely prevents violent cell rupture upon overcharge or excessive gassing of a galvanic alkaline cell.

It should be appreciated by one attempting to practice the invention, that although the design of a suitable gas diffusion membrane which will vent gas at the desired rate may be calculated from the physical properties of the plastic membrane material and from the dimensions of the membrane chosen, the relationship between rupture pressure and membrane thickness or area is empirical. Since most plastics are fairly elastic, and are subject to at least some cold flow, there is no defined stress-strain relation from which the bursting strength of a particular membrane may be calculated with complete certainty. Thus, the design of a membrane which will burst at a given pressure and which will vent gases at the desired rate, involves a trial and error technique to some extent. It will be apparent that the seal gasket should be made of a material resistant to cold flow in order to maintain close control of the design rupture pressure.

What is claimed is:

1. In a galvanic cell having a cup-shaped container and sealed in the open end of said container a cell closure comprising an annular U-shaped seal gasket having a central aperture therein, a rigid annular cover disposed in the U of said gasket and having a venting aperture therein, and a rivet extending through said central aperture and compressing said gasket between said cover and said rivet; the improvement wherein said seal gasket is composed of a gas permeable material resistant to cold flow and wherein said seal gasket has at least one combined safety blow-out and venting membrane consisting of an integral portion of said gasket thinner than adjacent areas of said gasket, said membrane being sufficiently thin to effect a rupture at excessive pressures within said cell.

2. The improvement defined in claim 1 wherein said gas permeable material resistant to cold flow is selected from the group consisting of nylon, vinyl and polyethylene.

3. The improvement defined in claim 1 wherein said gas permeable material resistant to cold flow is nylon.

4. The improvement defined in claim 1 wherein said membrane is least thick at its periphery.

5. The improvement defined in claim 1 wherein said membrane has a uniform thickness.

6. The improvement defined in claim 1 wherein said membrane is circular in configuration.

7. The improvement defined in claim 1 wherein said membrane is an annular ring.

8. The improvement defined in claim 1 wherein said seal gasket comprises a plurality of said membranes.

References Cited by the Examiner

UNITED STATES PATENTS

| | | |
| --- | --- | --- |
| 1,737,718 | 12/1929 | Hausmann. |
| 2,199,519 | 5/1940 | Collins et al. 220—44 |
| 2,693,499 | 11/1954 | Neumann 136—177 |
| 2,766,316 | 10/1956 | Stevens 136—133 |

FOREIGN PATENTS 293,597  2/1932  Italy.

WINSTON A. DOUGLAS, *Primary Examiner.*

JOHN H. MACK, *Examiner.*